United States Patent
Deng et al.

(10) Patent No.: US 10,907,613 B2
(45) Date of Patent: Feb. 2, 2021

(54) DAMPING MECHANICAL OSCILLATIONS OF A WIND TURBINE

(71) Applicant: SIEMENS AKTIENGESELLSCHAFT, Munich (DE)

(72) Inventors: Heng Deng, Ikast (DK); Bo Yin, Ikast (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 15/784,436

(22) Filed: Oct. 16, 2017

(65) Prior Publication Data
US 2018/0128243 A1    May 10, 2018

(30) Foreign Application Priority Data
Nov. 8, 2016   (DE) .................. 10 2016 221 864

(51) Int. Cl.
| | |
|---|---|
| F03D 7/04 | (2006.01) |
| F03D 17/00 | (2016.01) |
| F03D 9/25 | (2016.01) |
| F03D 7/02 | (2006.01) |
| F16F 15/00 | (2006.01) |
| G05B 19/048 | (2006.01) |

(52) U.S. Cl.
CPC .......... *F03D 7/048* (2013.01); *F03D 7/0224* (2013.01); *F03D 7/0296* (2013.01); *F03D 9/257* (2017.02); *F03D 17/00* (2016.05); *F16F 15/002* (2013.01); *G05B 19/048* (2013.01); *F05B 2270/334* (2013.01); *G05B 2219/2619* (2013.01); *Y02E 10/72* (2013.01)

(58) Field of Classification Search
None
See application file for complete search history.

(56) References Cited

U.S. PATENT DOCUMENTS

| | | | | | |
|---|---|---|---|---|---|
| 5,289,194 | A | * | 2/1994 | Schlosser | ............... H04B 1/123 342/378 |
| 5,517,123 | A | * | 5/1996 | Zhao | ...................... G01R 29/12 324/109 |

(Continued)

FOREIGN PATENT DOCUMENTS

| | | |
|---|---|---|
| WO | 2015086024 | 6/2015 |
| WO | 2016058610 | 4/2016 |
| WO | WO 2016/128004 A1 | 8/2016 |

OTHER PUBLICATIONS

EP Search Report dated Apr. 5, 2018; Application No. 17190735.5.
Non-English Chinese Office Action dated Jan. 31, 2019 for Application No. 201711091524.6.

*Primary Examiner* — Ziaul Karim
(74) *Attorney, Agent, or Firm* — Schmeiser, Olsen & Watts LLP (57) ABSTRACT

Provided is a method of damping mechanical oscillations of plural wind turbines of a wind park commonly supplying electric energy to a grid, the method including: determining, for each of the plural wind turbines, a damping control signal for counteracting an oscillation of the respective wind turbine; supplying at least a subset of or a subset of modified versions of the damping control signals to respective wind turbines such that a sum of the supplied damping control signals is lower than a threshold.

16 Claims, 3 Drawing Sheets

(56) References Cited

U.S. PATENT DOCUMENTS

| | | | |
|---|---|---|---|
| 8,823,193 B1 | 9/2014 | Clark | |
| 2009/0230682 A1* | 9/2009 | Bjerge | F03D 13/20 |
| | | | 290/44 |
| 2009/0266160 A1* | 10/2009 | Jeffrey | G01H 1/006 |
| | | | 73/455 |
| 2010/0283247 A1 | 11/2010 | Krueger | |
| 2012/0004781 A1* | 1/2012 | Santos | F03D 7/0284 |
| | | | 700/287 |
| 2012/0257967 A1* | 10/2012 | Egedal | F03D 7/0224 |
| | | | 416/1 |
| 2012/0310426 A1* | 12/2012 | Tarnowski | F03D 7/0284 |
| | | | 700/287 |
| 2013/0175871 A1* | 7/2013 | Knuppel | H02J 3/386 |
| | | | 307/102 |
| 2014/0097619 A1* | 4/2014 | Laborda Rubio | F03D 7/0296 |
| | | | 290/44 |
| 2014/0232198 A1 | 8/2014 | Garcia et al. | |
| 2015/0361954 A1 | 12/2015 | Nelson et al. | |
| 2016/0336888 A1 | 11/2016 | Busker | |
| 2016/0377058 A1 | 12/2016 | Caponetti et al. | |
| 2017/0226988 A1* | 8/2017 | KJ R | H02K 7/183 |
| 2017/0353035 A1* | 12/2017 | Guerrero | F01D 15/10 |
| 2018/0066630 A1* | 3/2018 | Kristoffersen | F03D 7/0224 |

\* cited by examiner

DAMPING MECHANICAL OSCILLATIONS OF A WIND TURBINE

CROSS-REFERENCE TO RELATED APPLICATIONS

This application claims priority to German application No. DE 10 2016 221 864.6 having a filing date of Nov. 8, 2016, the entire contents of which are hereby incorporated by reference.

FIELD OF TECHNOLOGY

The following relates to a method and to an arrangement as well as to a wind turbine adapted for damping mechanical oscillations of plural wind turbines of a wind park which are commonly supplying electric energy to a grid.

BACKGROUND

A wind turbine may comprise a wind turbine tower, a nacelle mounted on top of the tower, wherein the nacelle supports a rotor having connected thereto plural rotor blades. The rotor drives a generator also comprised in the nacelle which generates electric energy upon rotation of the rotor. A variable speed wind turbine may also comprise a converter connected electrically to the output terminals of the generator to convert the variable frequency power stream to a fixed frequency power stream. The fixed frequency power stream may be transformed to a higher voltage using one or more transformers and may be transmitted to a common connection point or point of common coupling to which plural wind turbines are electrically connected. The point of common coupling may, via one or more wind park transformers, be connected to a utility grid.

During operation of the wind turbine, there may be wind turbine oscillations in particular regarding movements of the wind turbine tower and/or movements of other components of the wind turbine, such as rotor blades. The wind turbine tower movements may comprise oscillatory side-side movements which may be in a direction perpendicular (or at least substantially perpendicular) to a plane spanned by a longitudinal axis of the wind turbine tower and an axis of the rotor of the wind turbine.

The oscillations or vibrations or periodic movements of the wind turbine tower (or other components of the wind turbine, like the drive train) may lead to oscillations of the power output of the wind turbine. These oscillations of the power output of the wind turbine may be undesired. The oscillations of the electrical output may comprise oscillations of the active power, the reactive power and/or the voltage.

These kinds of oscillations may violate requirements set by the grid operator. In particular, requirements for damping may be defined as a minimum requirement, meaning that this requirement is not negotiable. The minimum requirement and where used throughout the rules is referred to the term where the generating unit (in this case the wind turbine) and the generating system inclusively the power system must be adequately damped. The term "adequately damped" may be defined as follows:

In relation to a control system, when tested with a step change of a feedback input or corresponding reference, or otherwise observed, any oscillatory response at a frequency of (a) 0.05 Hz or less, has a damping ratio of at least 0.4;
(b) between 0.05 Hz and 0.6 Hz, has a halving time of 5 s or less (equivalent to a damping coefficient −0.14 nepers per second or less); and
(c) 0.6 Hz or more, has a damping ratio of at least 0.05 in relation to a minimum access standard and a damping ratio of at least 0.1 otherwise.

WO 2016/128004 A1 discloses a control system for damping structural vibration of a wind turbine system having multiple rotors. The system includes control means that receives vibration data associated with the support structure and which are configured to determine a damping control command for a respective one of the plurality of wind turbines, wherein each of the wind turbines includes a damping controller that receives a damping control command and which is operable to apply a damping control input to one or both of the blade pitch adjustment means and the generator power control means so as to counteract the measured vibration of the support structure.

Large power oscillations may have been observed at a point of common coupling (PCC) especially during past fault and during wind gust if low frequency oscillations of around 0.3 Hz from wind turbines in a wind farm have been synchronized at the PCC.

It has been observed, that conventional methods for damping mechanical oscillation of a wind turbine, in particular a wind turbine tower, are not in all circumstances or under all conditions sufficiently effective for providing power output at the wind turbine output terminal which satisfies said requirements.

SUMMARY

An aspect relates to a method, an arrangement and a wind turbine park, wherein mechanical oscillations of wind turbines are sufficiently and reliably damped, such as in particular requirements set by the grid operator are satisfied.

According to an embodiment of the present invention it is provided a method of damping mechanical oscillations of plural wind turbines of a wind park commonly supplying electric energy to a grid, the method comprising: determining, for each of the plural wind turbines, a damping control signal for counteracting an oscillation of the respective wind turbine; supplying at least a subset of or a subset of modified versions of the damping control signals to respective wind turbines such that a sum of the supplied damping control signals is lower than a threshold.

The method may be performed by a wind turbine controller or in particular by a wind park controller, such as a high performance park pilot (HPPP). The wind park controller may receive from the plural wind turbines operational data, in particular regarding the mechanical oscillations of all of the plural wind turbines. The mechanical oscillations may relate to a wind turbine tower oscillation, in particular a side-side oscillation and/or a fore-apt oscillation, i.e. an oscillation in the direction or at least substantially in the direction of the rotor axis of the rotor of the respective wind turbine.

The wind park may comprise the plural wind turbines which may be connected to a point of common coupling. The determination of the damping control signal for each of the plural wind turbines for counteracting the oscillation of the respective wind turbine may be performed in a conventional manner. Thereby, the damping control signal may be based on data relating to the actual oscillation, in particular mechanical oscillation and/or electrical oscillation, of the respective wind turbine. The determination of the damping control signal may involve computations and calculations as well as applying a physical/mathematical model. The damping control signals may be supplied (optically and/or electrically and/or wirelessly) to for example a converter of the respective wind turbine, to a blade adjustment system of the respective wind turbine or to even other adjustment systems which are capable for counteracting a mechanical oscillation. In particular, the damping control signal for a particular wind turbine may comprise a damping control signal which is adapted to control a blade pitch control system and/or a damping control signal which is adapted to control a converter. Controlling the converter may involve deriving and supplying plural gate driver signals, such as pulse width modulation signals, to high power electronic switches comprised in the converter. By appropriately controlling the conductance state of the plural power switches, a torque acting on the rotor may be adjusted such that it counteracts the respective mechanical oscillation of the wind turbine.

When the sum of the supplied damping control signal is lower than a threshold (close to zero or less the 10% or less than 5% of a conventional reference signal), the cumulative output (active power and/or reactive power and voltage) of the wind turbines may substantially be constant, i.e. may be essentially free of any undesired oscillation.

In the conventional art, in order to meet the grid requirement, the active power damping has to be disabled during post grid fault to avoid low frequency tower oscillation post fault where the grid voltage has not been recovered and stabilized. The active power damping is conventionally being enabled after grid voltage has been fully recovered and stabilized. Therefore, conventionally, during grid fault and post fault, tower oscillation/drive train oscillation may have been allowed which may have resulted in reduction of the lifetime span of the mechanical system due to heavy load during oscillations.

According to an embodiment of the present invention, however, the active damping may also apply on the selected subset of the wind turbines during or post grid fault, since the subset is selected such that the overall effect, i.e. the accumulated effect, reduces electrical oscillations rather than to enhance oscillations. Thereby, heavy load at the mechanical system due to oscillations, in particular during or post grid fault, may be reduced or even avoided due to the inventive damping method.

Thus, an effect of embodiments of the present invention may be to improve the active tower/drive train damping, in turn resulting to reduction of load or wear of the mechanical system.

According to an embodiment of the present invention, the oscillation of the respective wind turbine comprises a tower oscillation, in particular a side-side oscillation of the tower, and/or a drive train oscillation.

The side-side oscillation may involve a movement of the top of the tower in a direction perpendicular to a plane spanned by the wind turbine longitudinal axis and the rotational axis of the rotor. The wind turbine tower may oscillate according to a first structural mode and/or a second structural mode. In the first structural mode, an amplitude of the motion may increase from a foundation of the tower towards the top of the tower, such that the amplitude of the oscillations is maximal at the top of the tower. The oscillations may further comprise a second structural mode, wherein an amplitude may increase from the foundation of the tower towards a middle portion of the tower and may then decrease towards the top of the tower, such that the maximum amplitude of the oscillation may be present in the middle portion of the tower (along the longitudinal axis of the tower).

Embodiments of the present invention may be effective for damping different modes of oscillations, in particular for damping the first mode of oscillation and/or the second mode of oscillation or the tower.

Other structural oscillations or mechanical oscillations may involve oscillations of the drive train, potentially comprising a gearbox which may be arranged between the primary rotor shaft to which the plural rotor blades are connected and a secondary rotor shaft which drives the generator. Furthermore, the drive train may comprise one or more bearings which may also be excited regarding oscillations.

The (different kinds of) oscillations which may be effectively damped by the damping method may have a frequency between 0.1 Hz and 1 Hz, for example. Other values are possible.

According to an embodiment of the present invention, the oscillations of those wind turbines corresponding to the subset have essentially a same frequency. In particular, the wind park may comprise plural wind turbines which are of a same type, in particular regarding their mechanical construction, regarding wind turbine tower height and materials which are used to construct or manufacture the tower. When the frequency is the same for at least the subset of wind turbines (to which the damping control signals are supplied and applied), the damping control signals may differ only in the amplitude and the phase. Thereby, finding the subset may be simplified.

In other embodiments, the plural wind turbines may oscillate with different frequencies. In this case, each frequency may be considered separately. For example, for a first oscillation frequency, a first subset of wind turbines may be selected such that the sum of the respective damping control signal is lower than a first threshold. For the second oscillation frequency, a second subset of wind turbines may be selected for which the corresponding damping control signal may in a sum lower than a second threshold. Thereby, oscillations occurring in different types of wind turbines may effectively be damped. In case one or more wind turbines oscillate with more than one frequency, the respective damping control signals may comprise respective portions designed such that each of the frequencies of the wind turbine oscillations are counteracted.

According to an embodiment of the present invention, the determining the damping control signal comprises: measuring an oscillation of the wind turbine, in particular oscillation of the tower of the wind turbine; determining, based on the measured oscillation, an amplitude and a phase of the damping control signal such as to counteract the oscillation of the wind turbine.

The oscillation of the wind turbine may be measured for example using an accelerometer which measures a mechanical oscillation of the wind turbine. Other sensors may be possible, such as piezoelectric sensors. The measured oscillations may be characterized by one or more frequencies. For each frequency of the measured oscillation, a respective amplitude and a respective phase may be determined such that when the wind turbine is controlled using the damping control signal, the oscillation of the wind turbine is counteracted. Thereby, conventional methods may be applied. Thereby, the method may be simplified.

According to an embodiment of the present invention, the determining the amplitude and the phase comprises determining a Fourier transform, in particular using FFT, i.e. a Fast Fourier Transformation.

According to an embodiment of the present invention, the method further comprises selecting, based on the amplitude and phase of the plural damping control signals, particular damping control signals to form the subset. Thereby, the selection may be simplified.

According to an embodiment of the present invention, the method further comprises selecting, based on the amplitude and phase of the plural damping control signals, at least two damping control signals whose amplitude is essentially equal and whose phase is essentially opposite or has same absolute value but different sign or which have a phase difference of essentially 180°.

When two damping control signals have essentially the same amplitude and an opposite phase or a phase differing by essentially 180°, the sum of the two damping control signals may essentially be zero. Thus, supplying the two damping control signals to the two different wind turbines may essentially not result in any oscillations of the electrical output of the wind turbine. In other embodiments, more than two damping control signals may be considered, for example three, four or five or even more, which may have essentially a same or similar amplitude. Later on, their respective phases may be considered and a subset may be formed such that the sum of the respective damping control signals is essentially zero.

According to an embodiment of the present invention, the method further comprises supplying the amplitude and the phase of the plural damping control signals to a determining logic that outputs an enable or disable signal to define the subset. The enable signal may indicate that the respective wind turbine should actively be damped by supplying to the wind turbine the damping control signal. The disable signal may indicate that the respective wind turbine should not be actively damped such that the damping control signal is not supplied to the wind turbine.

According to an embodiment of the present invention, the method further comprises determining, based on the amplitude and phase of the plural damping control signals, weighting factors; forming, using the weighting factors, a weighted sum of damping control signals having the weighting factors, such that the weighted sum is smaller than the threshold.

According to this embodiment, all or essentially all wind turbines may be at least partially actively damped by supplying to them the respective weighted damping control signal which is weighted, i.e. which is multiplied by a particular weighting factor. Thereby, at least a partial damping of the corresponding oscillation of the wind turbine may be achieved while at the same time the sum of the weighted damping control signals may essentially be zero or at least smaller than a threshold.

According to an embodiment of the present invention, the measuring the oscillation of the wind turbines comprises measuring the oscillation of the wind turbine, in particular using an accelerometer, in particular measuring the oscillation of the wind turbine tower, or measuring an electrical output of the wind turbine. Thus, the oscillation of the wind turbine may be determined by monitoring a mechanical oscillation and/or an electrical oscillation.

Herein, it should be mentioned that the wind turbine typically outputs an AC signal having a particular frequency and a particular amplitude and a particular phase. The frequency of the AC signal may be nominally 50 Hz or 60 Hz. However, due to the oscillation of the tower and/or drive train, this nominal frequency may be superimposed with other lower frequencies. These lower frequency disturbances can be described by a variation of the amplitude of the nominal frequency oscillation. This oscillation of the amplitude may be measured, mechanically or/and electrically.

The method may further comprise supplying each of the damping control signals of the subset to the respective wind turbine, in particular to a blade pitch adjustment system and/or a converter connected to a generator.

The blade pitch adjustment system may be enabled to adjust a blade pitch angle to one or more rotor blades connected to the rotor. Thereby, a torque exerted by impacting wind may be changed periodically, such as to counteract the wind turbine oscillation. Similarly, the converter when controlled by the damping control signal may change the torque at the generator periodically also to counteract the mechanical oscillation of the wind turbine. Thereby, conventionally known techniques may be applied.

It should be understood that features, individually or in any combination, disclosed, described, explained or applied for a method of damping mechanical oscillations of plural wind turbines may also be applied to an arrangement for damping mechanical oscillations of plural wind turbines according to an embodiment of the present invention and vice versa.

According to an embodiment of the present invention it is provided an arrangement for damping mechanical oscillations of plural wind turbines of a wind park commonly supplying electric energy to a grid, the arrangement comprising: a determining module adapted to determine, for each of the plural wind turbines, a damping control signal for counteracting an oscillation of the respective wind turbine; a supply module adapted to supply at least a subset of or a subset or all of modified versions of the damping control signals to respective wind turbines such that a sum of the supplied damping control signals is lower than a threshold.

The arrangement may be comprised for example in a park controller, such as a high performance park pilot.

According to an embodiment of the present invention it is provided a wind turbine park including plural wind turbines and an arrangement as disclosed in the preceding embodiments.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
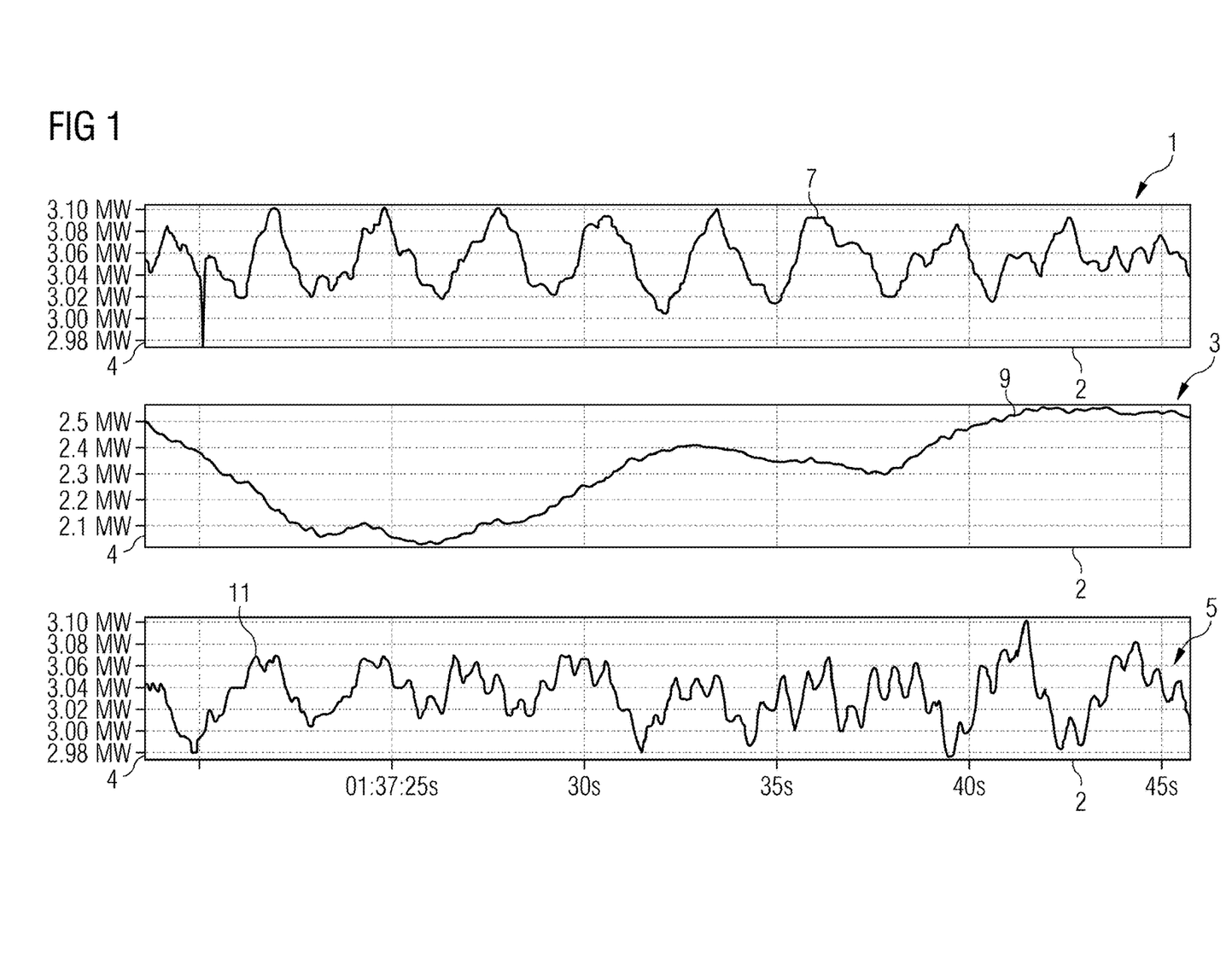
FIG. 1 illustrates graphs showing power output of wind turbines of a wind park.

The graphs 1, 3, 5 illustrated in FIG. 1 show the active power output 7, 9, 11 of three wind turbines of a wind park which commonly supply energy to a utility grid. Thereby, the abscissas 2 indicate time, while the ordinates 4 indicate the power. As can be observed from FIG. 1, the power trace 7 of the graph 1 exhibits a 0.3 Hz oscillation with amplitude of between 80 kW and 100 kW. The power trace 9 of the graph 3 does not contain a visible oscillation. However, the power trace 11 in graph 5 contains both tower oscillation and drive train oscillation. Herein, the tower oscillation may have a frequency of around 0.3 Hz which is comprised in the traces 7 and 11 of graphs 1 and 5.

Embodiments of the present invention are capable of damping drive train oscillations or tower oscillations of plural wind turbines which are commonly included in a wind park and are commonly connected to a utility grid. When the wind turbine whose power traces are illustrated in FIG. 1 are connected to a point of common coupling, especially during past fault and during wind gust, an oscillation of the electrical power at the point of common coupling may be conventionally observed which may be undesired and which may in particular violate requirements set by the grid operator.

Figure 2:
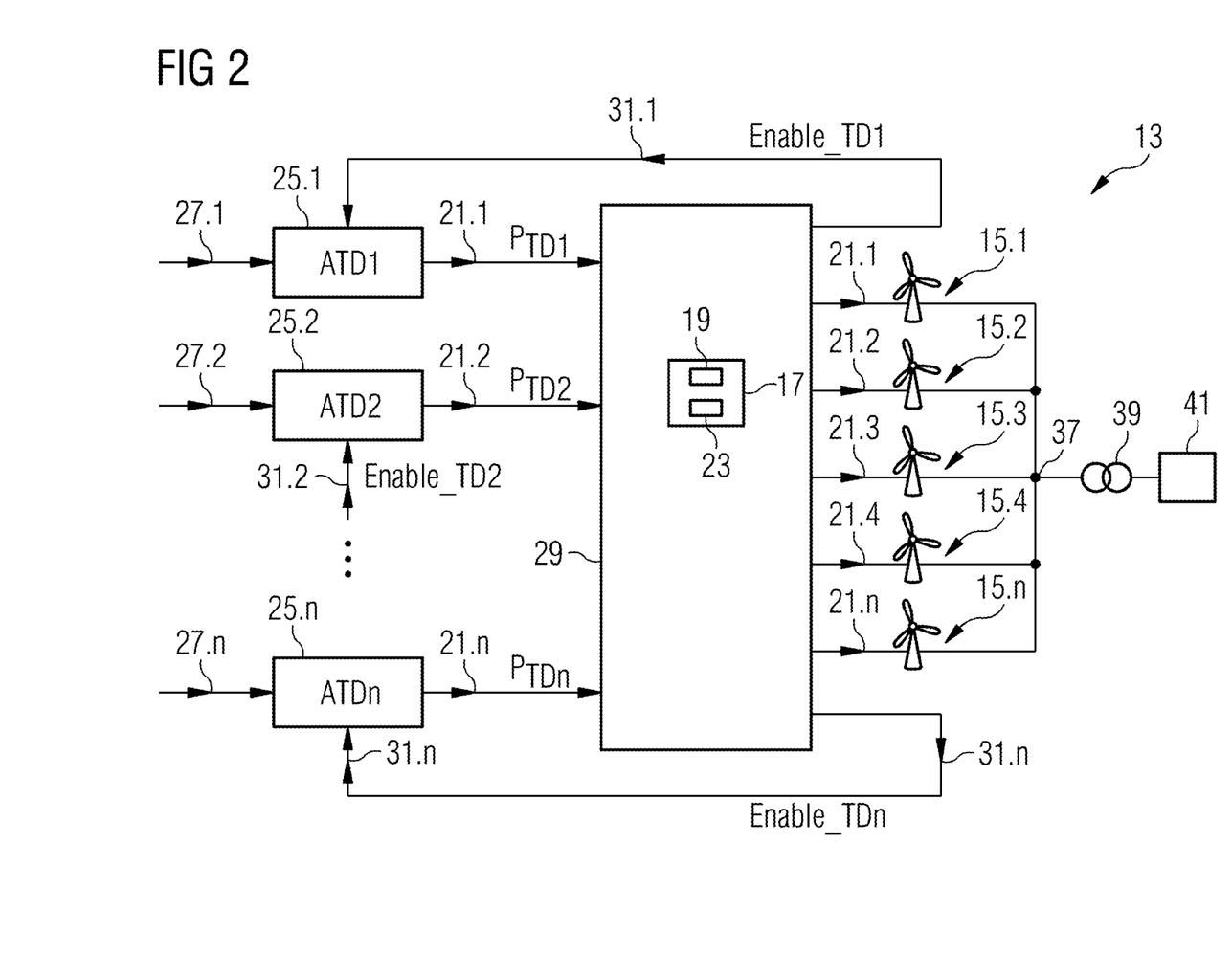
FIG. 2 schematically illustrates a wind park according to an embodiment of the present invention including an arrangement for damping mechanical oscillations of plural wind turbines according to an embodiment of the present invention.

FIG. 2 schematically illustrates a wind park 13 according to an embodiment of the present invention including plural wind turbines 15.1, . . . , 15.n and an arrangement 17 for damping mechanical oscillations of the plural wind turbines 15 according to an embodiment of the present invention. Thereby, the arrangement 17 is arranged to perform a method of damping mechanical oscillations of the plural wind turbines 15 according to an embodiment of the present invention.

The arrangement 17 comprises a determining module 19 which is adapted to determine, for each of the plural wind turbines 15.1, . . . , 15.n, a respective damping control signal 21.1, . . . 21.n for counteracting an oscillation of the respective wind turbine 15. The arrangement 17 further comprises a supply module 23 adapted to supply at least a subset (e.g. for wind turbines 15.1, 15.2) or a subset of modified versions of the damping control signals 21.1, 21.2 to the respective wind turbines 15.1, 15.2, such that a sum of the supplied damping control signals 21.1, 21.2 is lower than a threshold or is substantially zero.

The wind park comprises the wind turbines 15.1, 15.2, 15.3, 15.4, . . . , 15.n, wherein n may be between 10 and 300. The damping control signals 21.1, 21.2, . . . , 21.n may also be referred to as $P_{TD1}$, $P_{TD2}$, . . . $P_{TDn}$. The damping control signal may be derived using corresponding active tower damping modules 25.1, 25.2, . . . , 25.n which receive at input terminals oscillation signals 27.1, 27.2, 27.n relating to the oscillations of the wind turbines 15.1, 15.2, 15.3, . . . , 15.n, respectively. For measuring the oscillations and generating the oscillation signals 27.1, . . . , 27.n, the respective wind turbines may comprise for example an accelerometer.

Based on the measured oscillation signals 27.1, 27.2, . . . , 27.n, respectively, the active tower damping modules 25.1, 25.2, . . . , 25.n determine the active damping control signals 21.1, 21.2, . . . , 21.n.

The arrangement 17 is comprised in a high performance park pilot 29 which controls all the wind turbines 15.1, 15.2, . . . , 15.n of the wind park 13. The high performance park pilot 29 outputs enable signals 31.1, . . . , 31.n to the respective active tower damping modules 25.1, . . . , 25.n. Based on these enable signals 31.1, . . . , 31.n, the high performance park pilot 29 outputs the damping control signals 21.1, 21.2, . . . , 21.n to the particular subset of wind turbines, for example the subset comprised of wind turbines 15.1 and 15.2.

All the wind turbines 15.1, 15.2, . . . , 15.n are connected to a point of common coupling 37 which is connected via a wind park transformer 39 to a utility grid 41.

The proposed solution may be called a de-synchronization of active tower oscillation caused by active tower damping in individual turbines so that there is no significant oscillation seen at the point of common coupling 37 thus fulfilling grid code requirements at the point of common coupling 37.

Figure 3:
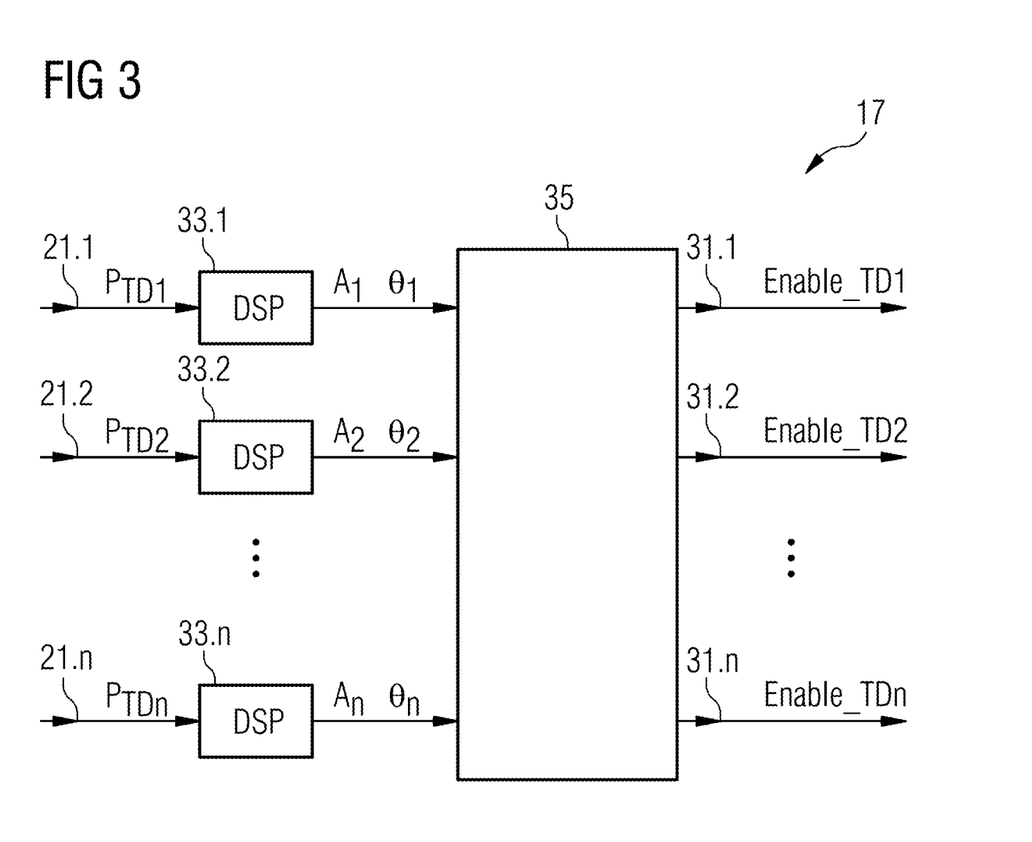
FIG. 3 schematically illustrates an arrangement for damping mechanical oscillations of plural wind turbines for a wind park, for example the wind park illustrated in FIG. 2, according to an embodiment of the present invention.

FIG. 3 schematically illustrates the arrangement 17 in more detail. Digital signal processing modules 33.1, 33.2, . . . , 33.n receive the damping control signals 21.1, 21.2, . . . , 21.n, respectively and derive therefrom amplitudes $A_1$, $A_2$, . . . , $A_n$ and phases $\Theta_1$, $\Theta_2$, . . . , $\Theta_n$ or a frequency of oscillation of the respective wind turbines 15.1, 15.2, . . . , 15.n, for example a side-side tower oscillation.

A determining logic 35 receives the amplitudes $A_1$, $A_2$, $A_n$ and phases $\Theta_1$, $\Theta_2$, . . . , $\Theta_n$, and derives the enable signal 31.1, 31.2, . . . , 31.n, respectively therefrom. Thereby, the digital signal processing modules 33.1, 33.2, . . . , 33.n may comprise a Fast Fourier Transformation algorithm to derive a Fourier transform of the damping control signals 21.1, 21.2, . . . , 21.n. The determining logic 35 sets the enable signals 31.1, 31.2, . . . , 31.n such that the sum of the associated damping control signals 21.1, 21.2, . . . , 21.n is lower than a threshold.

Thereby, e.g. the enable signals 31.1, 31.2 may, according to an exemplary embodiment, be true, while all other enable signals may be false. Thus, the subset, to which the damping control signals are supplied may be the wind turbines 15.1 and 15.2. Therefore, the damping control signals 21.1 and 21.2 are supplied, in particular from the high performance park pilot 29 to the wind turbines 15.1 and 15.2, respectively.

Thereupon, a not illustrated blade pitch adjustment system or/and a converter are controlled such as to respectively counteract the wind turbine oscillations of the respective wind turbines.

The proposed solution may be applied during normal operation as well as during grid faults or after grid faults. The tower oscillation de-synchronization algorithm may be located in a high performance power plant controller, such as HPPP 29 illustrated in FIG. 2, as part of a wind farm controller. Each wind turbine 15.1, 15.2, . . . , 15.n in the wind farm may send the needed damping power 21.1 (or an oscillation signal 27.1, 27.2, . . . , 27.n) through the communication network to the HPPP. The tower oscillation de-synchronization algorithm may collect the required active power damping for active power damping in HPPP and may select/enable the active tower damping features for these turbines (for example the turbines 15.1, 15.2) such that the sum of the active power demand of these wind turbines is close to zero.

The detailed setup of the de-synchronization algorithm shown in FIG. 3 utilizes a digital signal processing method such as FFT, to derive the amplitude and the phase of the damping power in real-time. For the wind turbine 15.1, the calculated amplitude and phase are $A_1$ and $\Theta_1$. For wind turbine 15.$n$, the amplitude and phase are $A_n$ and $\Theta_n$. The amplitude and phase of all the wind turbines are used to determine the subset of wind turbines in which active power damping control shall be enabled. For example, if $A_1 = A_2$ and $\Theta_1 = -\Theta_2$, both turbines 15.1 and 15.2 shall be enabled. In this way, there is no sufficient power oscillation at the point of common coupling 37 or the oscillation can at least be reduced and nevertheless tower damping may be enabled for at least a subset of the wind turbines.

A similar method may be used to reduce power oscillation after grid fault due to drive train oscillations.

Embodiments of the present invention may achieve the following advantages:
  Cancellation of power oscillation at PCC to fulfil grid code requirements
  No additional hardware required
  Expand mechanical system life span
  Stabilize grid due to less/no post fault oscillation especially for weak grid Further an advantage of the present invention may be that requirements of the stability of the tower may be less demanding, thereby saving manufacturing costs and material.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The claims are as follows:

1. A method of damping mechanical oscillations of a plurality of wind turbines of a wind park commonly supplying electric energy to a grid, the method comprising:
   determining, for each wind turbine of the plurality of wind turbines, a damping control signal for counteracting an oscillation of the respective wind turbine;
   selecting at least a subset of the damping control signals, the subset comprising at least a first damping control signal of a first wind turbine and a second damping control signal of a second wind turbine or a subset of modified versions of the damping control signals, the subset of modified versions comprising at least a first modified damping control signal of the first wind turbine and a second modified damping control signal of the second wind turbine, such that a sum of the selected damping control signals or a sum of the selected modified versions of the damping control signals is lower than a threshold; and
   supplying the selected subset of the damping control signals or the selected subset of the modified versions of the damping control signals to the respective wind turbines to counteract the oscillation of the respective wind turbines.

2. The method according to claim 1, wherein the oscillation of the respective wind turbine comprises a tower oscillation, the tower oscillation being a side-side oscillation of the tower and/or a drive train oscillation.

3. The method according to claim 1, wherein the oscillations of the respective wind turbines corresponding to the subset have a same frequency.

4. The method according to claim 1, wherein determining the damping control signal comprises:
   measuring an oscillation of the tower of the wind turbine;
   determining, based on the measured oscillation, an amplitude and a phase of the damping control signal such as to counteract the oscillation of the wind turbine.

5. The method according to claim 4, wherein determining the amplitude and the phase comprises determining a Fourier transform.

6. The method according to claim 4, wherein the selecting is performed based on the amplitude and phase of the plural damping control signals, to form the sub set.

7. The method according to claim 4, further comprising:
   selecting, based on the amplitude and phase of the plural damping control signals, at least two damping control signals with an amplitude that is equal and a phase that is opposite or has a same absolute value but different sign or a phase difference of 180°.

8. The method according to claim 4, further comprising:
   supplying amplitude and phase of the plural damping control signals to a determining logic that outputs an enable or disable signal to define the subset.

9. The method according to claim 4, further comprising:
   determining, based on the amplitude and phase of the plural damping control signals, weighting factors;
   forming, using the weighting factors, a weighted sum of damping control signals having weighting factors, such that the weighted sum is smaller than the threshold.

10. The method according to claim 1, wherein measuring the oscillation of the wind turbines comprises:
    measuring the oscillation of the wind turbine using an accelerometer, or measuring an electrical output of the wind turbine.

11. The method according to claim 1, further comprising:
    supplying each of the damping control signal of the subset to the respective wind turbines to a blade pitch adjustment system and/or a converter connected to a generator.

12. The method according to claim 1, wherein supplying the selected subset of the damping control signals or the selected subset of the modified versions of the damping control signals to the respective wind turbines also reduces electrical oscillations from the wind park as a whole.

13. An arrangement for damping mechanical oscillations of a plurality of wind turbines of a wind park commonly supplying electric energy to a grid, the arrangement comprising:
    a determining module adapted to determine, for each wind turbine of the plurality of wind turbines, a damping control signal for counteracting an oscillation of the respective wind turbine;
    a supply module adapted to:
      select at least a subset of the damping control signals, the subset comprising at least a first damping control signal of a first wind turbine and a second damping control signal of a second wind turbine or a subset of modified versions of the damping control signals, the subset of modified versions comprising at least a first modified damping control signal of the first wind turbine and a second modified damping control signal of the second wind turbine, such that a sum of the selected damping control signals or a sum of the selected modified versions of the damping control signals is lower than a threshold, and supply the selected subset of the damping control signals or the selected subset of the modified versions of the damping control signals to the respective wind turbines.

14. A wind turbine park, including:
the plurality of wind turbines; and
an arrangement according to the claim 13 connected to control the plurality of wind turbines.

15. The wind turbine park according to claim 14, wherein the selected subset of the damping control signals or the selected subset of the modified versions of the damping control signals counteract the oscillation of the respective wind turbines.

16. The wind turbine park according to claim 14, wherein the selected subset of the damping control signals or the selected subset of the modified versions of the damping control signals reduce electrical oscillations from the wind park as a whole.

* * * * *